United States Patent
Tatangelo et al.

(10) Patent No.: US 10,408,343 B2
(45) Date of Patent: Sep. 10, 2019

(54) CONTINUOUSLY VARIABLE TRANSMISSION PUMP LIMITED STOP CONTROLS

(71) Applicant: GM Global Technology Operations LLC, Detroit, MI (US)

(72) Inventors: Joseph W. Tatangelo, Wolverine Lake, MI (US); Paul G. Otanez, Franklin, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 223 days.

(21) Appl. No.: 15/639,510

(22) Filed: Jun. 30, 2017

(65) Prior Publication Data

US 2019/0003588 A1 Jan. 3, 2019

(51) Int. Cl.
  *F16H 61/662* (2006.01)
  *F16H 9/18* (2006.01)
  *F16H 61/66* (2006.01)

(52) U.S. Cl.
  CPC ......... *F16H 61/66231* (2013.01); *F16H 9/18* (2013.01); *F16H 61/66272* (2013.01); *F16H 2061/6605* (2013.01); *F16H 2312/18* (2013.01)

(58) Field of Classification Search
  CPC ... F16H 61/662; F16H 61/66231; F16H 59/54
  See application file for complete search history.

(56) References Cited

U.S. PATENT DOCUMENTS

| | | | |
|---|---|---|---|
| 4,509,125 A | 4/1985 | Fattic et al. | |
| 4,710,879 A | 12/1987 | Vahabzadeh et al. | |
| 4,787,268 A * | 11/1988 | Falzoni | F16D 43/284 475/199 |
| 5,047,937 A | 9/1991 | Vahabzadeh et al. | |
| 6,579,206 B2 | 6/2003 | Liu et al. | |
| 2014/0163845 A1* | 6/2014 | Otanez | F02D 29/02 701/112 |
| 2015/0075360 A1* | 3/2015 | Takahashi | F15B 13/0442 91/361 |

* cited by examiner

*Primary Examiner* — Edwin A Young

(57) ABSTRACT

A continuously variable transmission pump limited stop controls system includes a continuously variable transmission (CVT) including primary and secondary variator pulleys. The primary and the secondary variator pulley each have a mating half with a conical face, defining a variable-width gap between each pulley and its mating half. A flexible member is positioned within the gap and is movable on the conical faces defining a CVT ratio. A secondary pulley valve controls flow of a fluid to the secondary variator pulley. A secondary pulley pressure boost system identifies if a rapid stop event is occurring and issues a command to fully open the secondary pulley valve during the rapid stop event. As the CVT ratio reaches a predetermined threshold of a desired relaunch ratio during the rapid stop event, an engine speed request is issued to an engine connected to the CVT to increase engine speed.

20 Claims, 2 Drawing Sheets

CONTINUOUSLY VARIABLE TRANSMISSION PUMP LIMITED STOP CONTROLS

INTRODUCTION

The present disclosure relates to ratio control of continuously variable transmissions during vehicle deceleration conditions.

A continuously variable transmission (CVT) is a type of power transmission that is capable of achieving infinite variability between a highest and a lowest possible speed ratio. Unlike conventionally-geared transmissions that use one or more planetary gear sets and multiple rotating and braking friction clutches to establish a discrete gear state, a CVT uses a variable-diameter pulley system known as a variator assembly to transition anywhere within a calibrated range of speed ratios.

A typical variator assembly includes two variator pulleys interconnected via an endless rotatable drive element such as a chain or a belt. The drive element rides in a variable-width gap defined by conical faces of mating halves of the pulleys. One of the pulleys is typically connected to an engine crankshaft and thus acts as a driving/primary pulley. The other pulley is connected to a CVT output shaft to act as a driven/secondary pulley. One or more gear sets could be used on the input and/or output side of the variator assembly depending on the design. In order to vary a CVT speed ratio, a shift force is applied to the primary pulley and/or the secondary pulley via one or more pulley actuators. The shift force effectively squeezes the pulley halves together to change the width of the gap between the conical pulley faces. Variation in the gap size, which is also referred to as the pitch radius, causes the drive element to ride higher or lower within the gap. This in turn changes the effective diameters of the variator pulleys and thus the speed ratio of the CVT.

The ratio between the input and output shafts is desirably varied from an underdrive ratio at vehicle launch to an overdrive ratio at cruising speeds. A hydraulic pump provides hydraulic fluid pressure for ratio control. During certain conditions such as a panic stop or high vehicle deceleration an available flow rate of the hydraulic pump may not be able to achieve a desired ratio rate over the time frame of the deceleration condition, thereby failing to achieve the final desired underdrive ratio, therefore resulting in poor relaunch performance.

Thus, while current CVT ratio control systems achieve their intended purpose, there is a need for a new and improved system and method for ratio control of a CVT during vehicle deceleration.

SUMMARY

According to several aspects, a continuously variable transmission pump limited stop controls system includes a continuously variable transmission (CVT) including a primary variator pulley and a secondary variator pulley each defining a set of pulley members creating a variable-width gap. A flexible member is positioned within the variable-gap and moves to define a CVT ratio. A secondary pulley valve controls flow of a fluid to the secondary variator pulley. A secondary pulley pressure boost system identifies if a rapid stop event is occurring and issues a command to fully open the secondary pulley valve during the rapid stop event.

In another aspect of the present disclosure, the secondary pulley pressure boost system further includes a pressure boost module having a table of scalar calibration data to identify a degree of open position of the secondary pulley valve.

In another aspect of the present disclosure, the pressure boost module generates a command signal to change the degree of open position of the secondary pulley valve.

In another aspect of the present disclosure, the secondary pulley pressure boost system further includes a limit module receiving the command signal from the pressure boost module and evaluating a CVT ratio rate using a table of CVT ratio rate data to identify if the ratio rate of the CVT justifies modification of the command signal to produce a reduced rate of change of the ratio rate prior to an end of the rapid stop event.

In another aspect of the present disclosure, the secondary pulley pressure boost system further includes a partial pressure boost module determining a time to ratio for the vehicle to reach a zero speed based on a measured current vehicle speed and a measured vehicle deceleration rate.

In another aspect of the present disclosure, the secondary pulley pressure boost system further includes a limit module receiving a signal from the partial pressure boost module and evaluating a CVT ratio rate using a table of CVT ratio rate data to identify if the ratio rate of the CVT justifies modification of the command signal to produce a reduced rate of change of the ratio rate prior to an end of the rapid stop event.

In another aspect of the present disclosure, the reduced rate of change of the ratio rate modifies a secondary pulley pressure target.

In another aspect of the present disclosure, as the CVT ratio exceeds a desired ratio, an engine speed request is issued to an engine to increase engine speed and thereby increase an output from a fluid pump providing fluid flow to the secondary pulley valve.

In another aspect of the present disclosure, the rapid stop event defines a panic stop event.

In another aspect of the present disclosure, the rapid stop event defines a sudden stop event occurring from a vehicle speed not greater than a vehicle speed threshold.

According to several aspects, a continuously variable transmission pump limited stop controls system includes a continuously variable transmission (CVT) including primary and secondary variator pulleys. The primary and the secondary variator pulley each have a mating half with a conical face, defining a variable-width gap between each pulley and its mating half. A flexible member is positioned within the gap and is movable on the conical faces defining a CVT ratio. A secondary pulley valve controls flow of a fluid to the secondary variator pulley. A secondary pulley pressure boost system identifies if a rapid stop event is occurring and issues a command to fully open the secondary pulley valve during the rapid stop event. As the CVT ratio reaches a predetermined threshold of a desired relaunch ratio during the rapid stop event, an engine speed request is issued to an engine connected to the CVT to increase engine speed.

In another aspect of the present disclosure, the engine speed request increases an output from a fluid pump providing fluid flow to the secondary pulley valve.

In another aspect of the present disclosure, the engine speed request is made when the following condition exists: a time until the vehicle is stopped is less than a predetermined calibrated threshold.

In another aspect of the present disclosure, the engine speed request is made when the following additional conditions exist: a panic stop has been detected; and an engine speed request has not already been issued for a current panic stop condition.

In another aspect of the present disclosure, the engine speed request is made when the following additional conditions exist: a torque converter clutch is open; the secondary pulley pressure boost request is greater than a predetermined calibrated threshold; and a real speed ratio is greater than a predetermined calibrated threshold.

In another aspect of the present disclosure, the engine speed request is made when the following additional conditions exist: a brake pedal position is greater than a predetermined calibrated threshold; and a duration of the engine speed request is less than a predetermined calibrated time.

In another aspect of the present disclosure, the engine speed request is issued when the secondary pulley pressure boost system identifies an output pressure from the secondary pulley valve is decreasing identifying an end of the rapid stop event.

According to several aspects, a continuously variable transmission pump limited stop controls system includes a continuously variable transmission (CVT) including: a primary variator pulley and a secondary variator pulley each defining a set of pulley members creating a variable-width gap. A flexible member is positioned within the variable-gap and moves to define a CVT ratio. A secondary pulley valve controls flow of a fluid to the secondary variator pulley. A secondary pulley pressure boost system identifies if a rapid stop event is occurring and issues a command to fully open the secondary pulley valve during the rapid stop event. The secondary pulley pressure boost system includes: a decision module identifying when the rapid stop event is not occurring when the vehicle is decelerating; and a partial pressure boost module receiving a signal from the decision module when the rapid stop event is not occurring. The partial pressure boost module determines a time to ratio for the vehicle to reach a zero speed.

In another aspect of the present disclosure, the time to ratio is based on a current vehicle speed and a vehicle deceleration rate.

In another aspect of the present disclosure, the partial pressure boost module issues a command to at least partially shut the secondary pulley valve to produce a reduced rate of change of the CVT ratio prior to an end of the rapid stop event.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
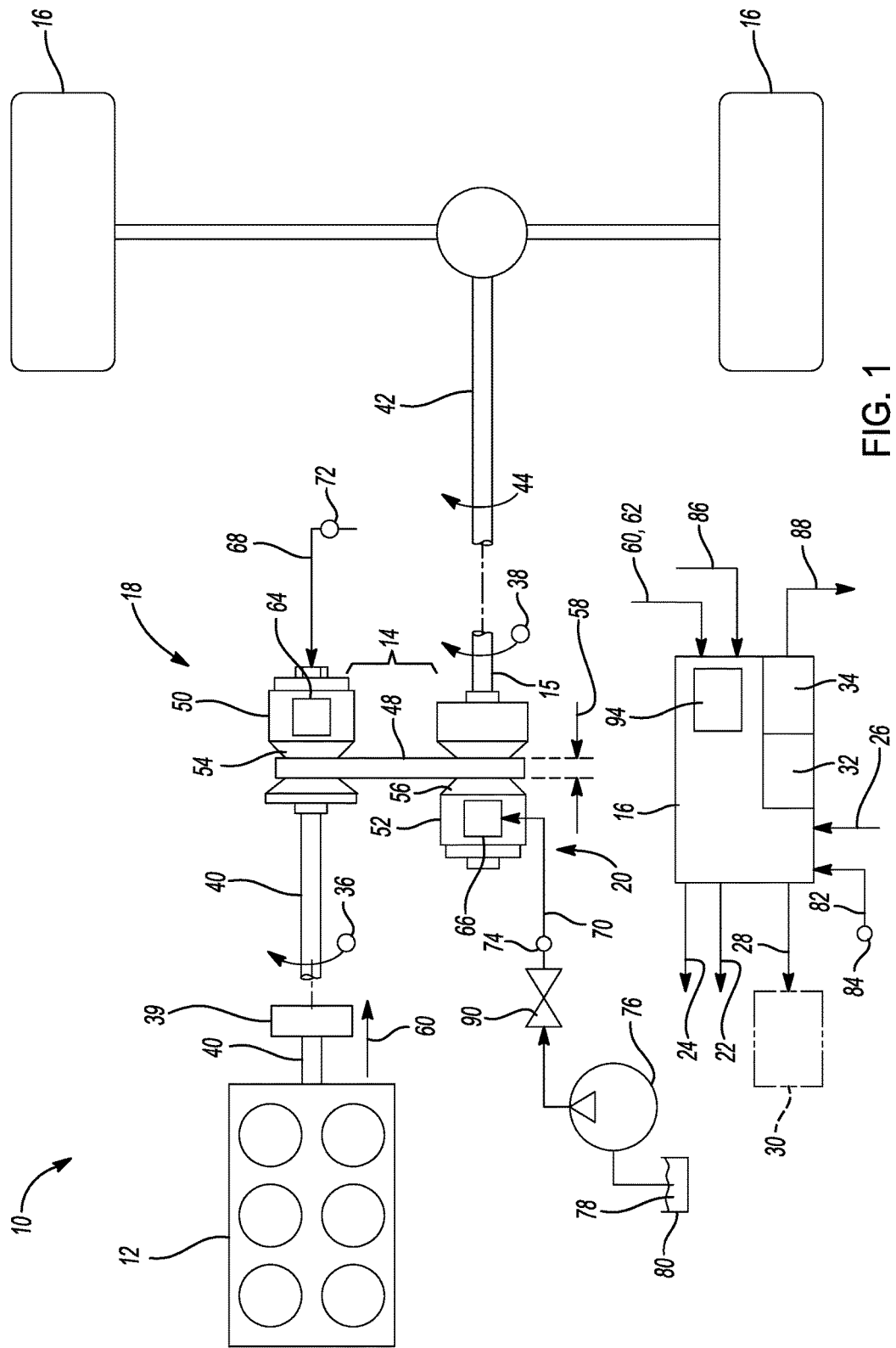
FIG. 1 is a schematic illustration of a continuously variable transmission pump limited stop control system according to an exemplary embodiment.

Referring to the drawings, wherein like reference numbers correspond to like or similar components throughout the several figures, a vehicle 10 is shown schematically in FIG. 1. The vehicle 10 includes a torque generating device 12, shown for example as an internal combustion engine, but which also may be embodied as a battery powered electrical motor device or other suitable device operable for generating output torque. For illustrative consistency, the torque generating device 12 will be described hereinafter as an engine 12 without limiting the scope to such a design.

The vehicle 10 also includes a continuously variable transmission (CVT) 14 and a controller 16. The controller 16 is programmed to perform ratio control and to calculate a current ratio of the CVT 14, and to perform other actions with respect to the CVT 14 during a sudden stop event or a panic stop event of the vehicle 10, as will be described in greater detail in reference to FIG. 2.

The CVT 14 includes a primary variator pulley 18 and a secondary variator pulley 20. The controller 16 is further programmed to transmit a primary pulley pressure control signal 22, and a secondary pulley pressure control signal 24 to the primary and secondary variator pulleys 18 and 20 during normal operation, and further after a sudden stop event or a panic stop event during which a programmed/calibrated CVT ratio optimal for re-launch, hereinafter a first threshold ratio 26, is desired, and to communicate a state signal 28 to another controller, e.g., an engine control module (ECM) 30, after such a sudden stop event or panic stop event.

The controller 16 may be configured as one or more computer devices having a memory 32. The controller 16 may include hardware elements such as a processor 34, circuitry including but not limited to a timer, oscillator, analog-to-digital circuitry, digital-to-analog circuitry, proportional-integral-derivative (PID) control logic, a digital signal processor, and any necessary input/output devices and other signal conditioning and/or buffer circuitry. The memory 32 may include tangible, non-transitory memory such as read only memory, e.g., magnetic, solid-state/flash, and/or optical memory, as well as sufficient amounts of random access memory, electrically-erasable programmable read-only memory, and the like. Steps embodying a method of operating the system of the present disclosure may be recorded in the memory 32 and executed by the processor 34 in the overall control of the vehicle 10.

The controller 16 is programmed with the first threshold ratio 26 via programming of the memory 32 of the controller 16, e.g., in a lookup table. The controller 16 determines whether the threshold is reached during the sudden stop event or a panic stop event upon crossing or dropping below a calibrated ratio indicative of a last known valid calculated measurement. Such a value may be determined offline and stored in the memory 32, and may be expected to vary based on the design of particular speed sensors 36, 38 being used, as well as the vehicle platform, a torque converter clutch (TCC) 39 of a torque converter, and variator geometry.

The engine 12 includes an output shaft or crankshaft 40. The crankshaft 40 is connected to the CVT 14, which in turn includes an output shaft 42. The output shaft 42 ultimately delivers output torque 44 to a set of driven wheels 46. The CVT 14 includes the primary variator pulley 18, which is connected to and driven by the crankshaft 40, the secondary variator pulley 20 which is connected to the output shaft 42, and a flexible continuous rotating drive element or CVT chain 48. The term "chain" as used herein refers to any closed/endless loop of metal and/or rubber suitable for transmitting torque from the primary variator pulley 18 to the secondary variator pulley 20, including a loop of chain or a conventional rubber and metal CVT drive belt. For simplicity, the term "chain" is used hereinafter to refer to any suitable endless rotatable element.

The primary and secondary variator pulleys 18 and 20 each define a set of pulley members, each set having a fixed portion having conical faces and an oppositely directed mating half 50 and 52, respectively, with respective conical faces 54 and 56 that are oppositely movable to define a variable-width gap 58. The chain 48 is positioned within the gap 58 and rides on the conical faces 54 and 56 as the engine 12 powers the primary variator pulley 18 at an engine or primary pulley speed 60, which thus acts as the input speed/primary speed of the primary variator pulley 18. The secondary variator pulley 20 rotates at a secondary pulley speed 62.

The width of the gap 58 may be varied via movement of the mating halves 50 and/or 52 as to change the ratio of the CVT 14. Therefore, the vehicle 10 of FIG. 1 includes respective first and second variator actuators 64 and 66 each responsive to primary and secondary pressures 68 and 70 respectively, measurable via corresponding pulley pressure sensors 72, 74 which move the respective primary and secondary variator pulleys 18 and 20 toward each other. A return spring (not shown) or other return mechanism within at least one of the primary and secondary variator pulleys 18 and 20 moves the primary and secondary variator pulleys 18 and 20 away from each other when the respective primary and secondary pressures 68, 70 are released. While shown schematically in FIG. 1 for illustrative simplicity, an example embodiment of the first and second actuators 64 and 66 includes a hydraulic piston/cylinder system, although other linear actuators may be used such as electromechanical devices or pneumatic pistons.

The first actuator 64 of FIG. 1 acts on a moveable one of the mating halves 50 of the primary variator pulley 18 in response to application of the primary pressure 68. Likewise, the second actuator 66 acts on a moveable one of the mating halves 52 of the secondary variator pulley 20 in response to the secondary pressure 70. Line pressure may be provided to the CVT 14 via a fluid pump 76 as shown, with the fluid pump 76 drawing a fluid 78 such as oil from a sump 80 and circulating the fluid 78 to the CVT 14 via hoses, fittings, and other suitable fluid conduit (not shown). The fluid pump may be a two mode pump, operating in either a half mode or a full mode. To maximize fuel economy it is desirable during normal engine operation for the fluid pump 76 to operate in half mode.

The controller 16, which is in communication with the first and second actuators 64 and 66, receives a set of control inputs. The control inputs may include a vehicle speed 82 as reported, calculated, or measured by one or more wheel or transmission output speed sensors 84, the primary and secondary pulley speeds 60, 62, and an output torque request 86. As is known in the art, the output torque request 86 is typically determined by actions of a driver of the vehicle 10, such as via the present throttle request, braking levels, gear state, and the like. The controller 16 may further issue an engine speed request 88 in response to a sudden stop event or a panic stop event. The controller 16 may further direct the opening or closing of at least a secondary pulley valve 90 which controls flow of the fluid 78 to the secondary variator pulley 20.

Referring to FIG. 2 and again to FIG. 1, a continuously variable transmission pump limited stop controls system 91 of the present disclosure provides a secondary pulley pressure target 92 normally output from the controller 16. In addition to the controller 16, the continuously variable transmission pump limited stop controls system 91 includes a secondary pulley pressure boost system 94 providing additional operational controls during a sudden stop event or a panic stop event. The secondary pulley pressure boost system 94 evaluates in a decision module 96 if a rapid stop event defined as either a sudden stop event or a panic stop event is occurring and if so via the controller 16 sends an opening command to the secondary pulley valve 90 for the secondary variator pulley 20, and sends a command to the fluid pump 76 if the fluid pump 76 is operating at half mode to change to full flow operating mode. For example, if the decision module 96 identifies in the affirmative that the rapid stop event defining a panic stop event is occurring, an affirmative signal 98 is forwarded to a pressure boost module 100, which enters a table of scalar calibration data 101 to identify a current degree or open position of the secondary pulley valve 90, and produces a command signal 102 forwarded to the secondary pulley valve 90 to change from its current degree or open position to a maximum open position.

The command signal 102 from the pressure boost module 100 is routed via a limit module 104. The limit module 104 evaluates the CVT ratio rate against a table of CVT ratio rate data. Near the end of the panic stop or sudden stop event limit module 104 identifies if the ratio rate of the CVT 14 justifies modification of the command signal 102 produced by the pressure boost module 100 to produce a reduced rate of change of the ratio rate to permit a smoother transition to a lower ratio rate. During a panic stop event defined as a full brake pressure application during operation at a high vehicle speed such as a highway speed, or during a sudden stop event defined as a full brake pressure application during operation at a lower vehicle speed such as for example at or below a vehicle speed threshold defined for example as an initial speed of approximately 30 mph or less, it is anticipated that the ratio rate may not bottom out and a re-launch may not occur from the lowest possible underdrive ratio, therefore the limit module 104 will not modify the command signal from the pressure boost module 100 during these events.

The output command signal from the limit module 104 is combined with the secondary pulley pressure target 92 in an additive module 106 to produce a secondary pulley pressure target 108. The secondary pulley pressure target 108 is applied until the end of the event.

As a further means of achieving a desired re-launch underdrive ratio in response to a rapid stop event, as the CVT ratio exceeds a predetermined threshold of the desired speed ratio, an engine speed request 110 is issued to the engine 12 to increase engine speed and thereby increase an output from the fluid pump 76. Because of the time lag to achieve the benefit of increased engine speed on the pump rate of the fluid pump 76, engine speed requests 110 provide the maximum benefit toward the end of the braking maneuver. Engine speed requests 110 are therefore made when the following conditions exist:
1) A panic stop has been detected and is confirmed by the decision module 96;
2) An engine speed request has not already been issued for the current panic stop condition;
3) The torque converter clutch (TCC) 39 is open;
4) A time until the vehicle is stopped is less than a predetermined calibrated threshold. This time is calculated based on a current vehicle speed and a current vehicle deceleration rate.

5) The secondary pulley pressure boost request is greater than a predetermined calibrated threshold;
6) The real speed ratio is greater than a predetermined calibrated threshold;
7) The brake pedal position is greater than a predetermined calibrated threshold; and
8) A duration of the engine speed request is less than a predetermined calibrated time.

Figure 2:
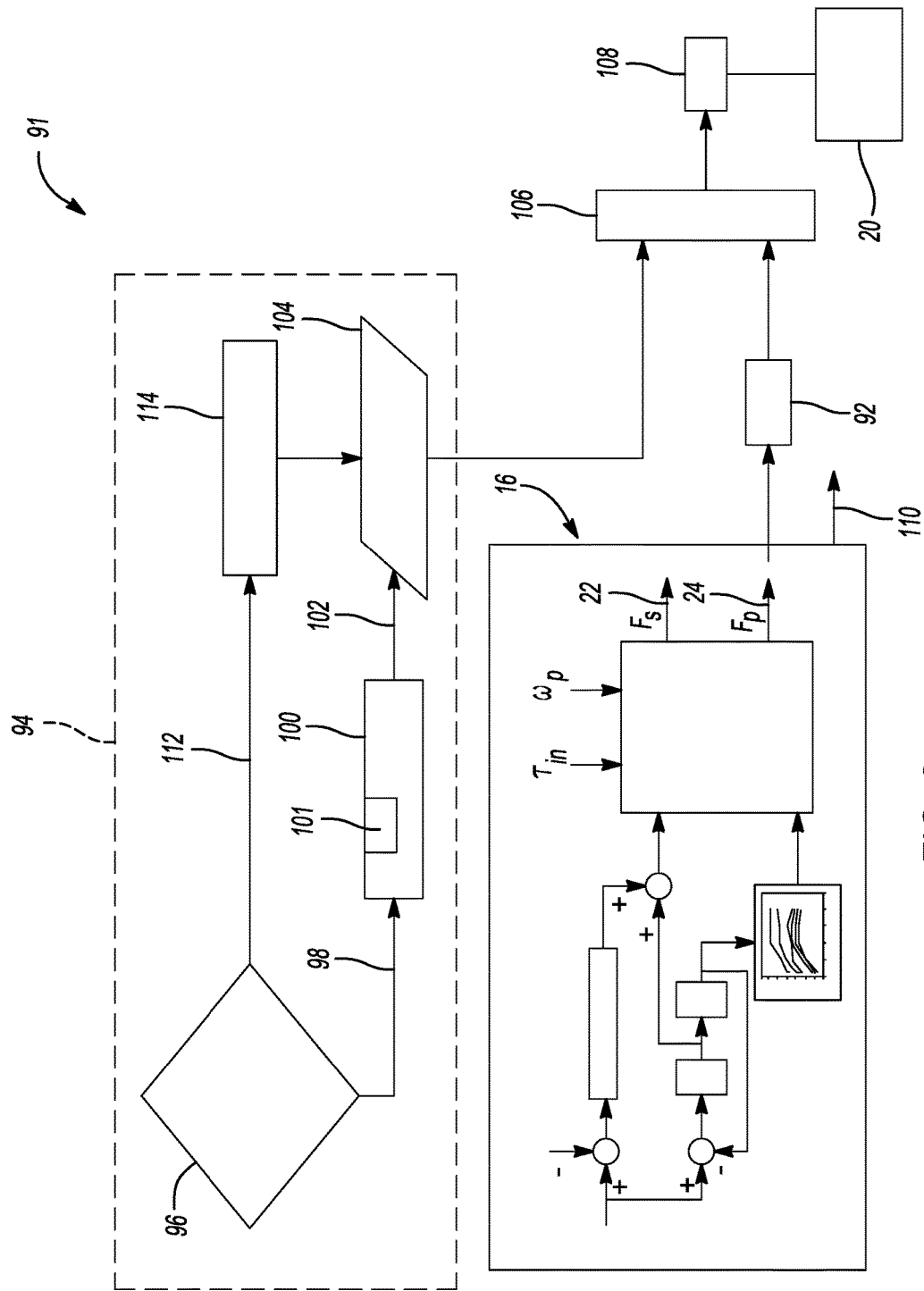
FIG. 2 is a flow diagram of the control system of FIG. 1.

With continued reference to FIG. 2, the secondary pulley pressure boost system 94 provides additional operational controls to boost secondary pulley pressure during certain fast braking operations when a panic stop event is not occurring, however a calculated time to achieve a desired CVT ratio may not permit re-launch from the lowest possible underdrive ratio. As previously noted the secondary pulley pressure boost system 94 continuously evaluates in the decision module 96 if either a sudden stop event or a panic stop event is occurring. If the response from the decision module 96 is NO during a fast braking event when the vehicle is decelerating, a signal 112 is sent to a partial pressure boost module 114. The partial pressure boost module 114 determines a calculated time or "time to ratio" for the vehicle to reach a zero speed based on a measured or sensed current vehicle speed and a measured or sensed vehicle deceleration rate.

During this time normal trajectory and ratio control using the controller 16 are available, however the secondary pulley valve 90 is not fully open and the actual ratio is diverging from the commanded ratio. A table of real ratio error is entered to identify if the CVT real ratio can be improved by further opening the secondary pulley valve 90 by an additional amount, for example by opening the secondary pulley valve 90 by an additional 10%. If additional reduction in the CVT ratio can be obtained considering the time to ratio, the partial pressure boost module 114 forwards a signal via the limit module 104 to further open the secondary pulley valve 90, and therefore to change the modified secondary pulley pressure target 108.

A continuously variable transmission pump limited stop controls system of the present disclosure offers several advantages. These include the ability to maximize hydraulic pump delivery during panic stop and rapid vehicle deceleration events to provide a CVT ratio required to meet subsequent launch demand. The system also generates an engine speed increase command near the end of the panic stop event to further enhance pump performance to achieve the desired CVT ratio at the end of the event.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A continuously variable transmission pump limited stop controls system, comprising:
   a continuously variable transmission (CVT) including:
      a primary variator pulley and a secondary variator pulley each defining a set of pulley members creating a variable-width gap; and
      a flexible member positioned within the variable-gap and movable to define a CVT ratio;
   a secondary pulley valve controlling flow of a fluid to the secondary variator pulley; and
   a secondary pulley pressure boost system identifying if a rapid stop event is occurring and issuing a command to fully open the secondary pulley valve during the rapid stop event.

2. The continuously variable transmission pump limited stop controls system of claim 1, wherein the secondary pulley pressure boost system further includes a pressure boost module having a table of scalar calibration data to identify a degree of open position of the secondary pulley valve.

3. The continuously variable transmission pump limited stop controls system of claim 2, wherein the pressure boost module generates a command signal to change the degree of open position of the secondary pulley valve.

4. The continuously variable transmission pump limited stop controls system of claim 3, wherein the secondary pulley pressure boost system further includes a limit module receiving the command signal from the pressure boost module and evaluating a CVT ratio rate using a table of CVT ratio rate data to identify if the ratio rate of the CVT justifies modification of the command signal to produce a reduced rate of change of the ratio rate prior to an end of the rapid stop event.

5. The continuously variable transmission pump limited stop controls system of claim 2, wherein the secondary pulley pressure boost system further includes a partial pressure boost module determining a time to ratio for a vehicle to reach a zero speed based on a measured current vehicle speed and a measured vehicle deceleration rate.

6. The continuously variable transmission pump limited stop controls system of claim 5, wherein the secondary pulley pressure boost system further includes a limit module receiving a signal from the partial pressure boost module and evaluating a CVT ratio rate using a table of CVT ratio rate data to identify if the ratio rate of the CVT justifies modification of the command signal to produce a reduced rate of change of the ratio rate prior to an end of the rapid stop event.

7. The continuously variable transmission pump limited stop controls system of claim 6, wherein the reduced rate of change of the ratio rate modifies a secondary pulley pressure target.

8. The continuously variable transmission pump limited stop controls system of claim 1, wherein as the CVT ratio exceeds a desired ratio, an engine speed request is issued to an engine to increase engine speed and thereby increase an output from a fluid pump providing fluid flow to the secondary pulley valve.

9. The continuously variable transmission pump limited stop controls system of claim 1, wherein the rapid stop event defines a panic stop event.

10. The continuously variable transmission pump limited stop controls system of claim 1, wherein the rapid stop event defines a sudden stop event occurring from a vehicle speed not greater than a vehicle speed threshold.

11. A continuously variable transmission pump limited stop controls system, comprising:
    a continuously variable transmission (CVT) including:
       a primary variator pulley and a secondary variator pulley;
       each of the primary and the secondary variator pulley having a mating half with a conical face, thereby defining a variable-width gap between each pulley and its mating half;
       a flexible member positioned within the gap and movable on the conical faces to define a CVT ratio;

a secondary pulley valve controlling flow of a fluid to the secondary variator pulley; and a secondary pulley pressure boost system identifying if a rapid stop event is occurring and issuing a command to fully open the secondary pulley valve during the rapid stop event;

wherein as the CVT ratio reaches a predetermined threshold of a desired relaunch ratio during the rapid stop event, an engine speed request is issued to an engine connected to the CVT to increase engine speed.

12. The continuously variable transmission pump limited stop controls system of claim 11, wherein the engine speed request increases an output from a fluid pump providing fluid flow to the secondary pulley valve.

13. The continuously variable transmission pump limited stop controls system of claim 12, wherein the engine speed request is made when the following condition exists: a time until a vehicle is stopped is less than a predetermined calibrated threshold.

14. The continuously variable transmission pump limited stop controls system of claim 13, wherein the engine speed request is made when the following additional conditions exist:

a panic stop defining a full brake pressure application during operation at a high vehicle speed including a highway speed has been detected; and the engine speed request has not already been issued for a current panic stop condition.

15. The continuously variable transmission pump limited stop controls system of claim 14, wherein the engine speed request is made when the following additional conditions exist:

a torque converter clutch is open;

a secondary pulley pressure boost request is greater than a predetermined calibrated threshold; and a real speed ratio is greater than a predetermined calibrated threshold.

16. The continuously variable transmission pump limited stop controls system of claim 15, wherein the engine speed request is made when the following additional conditions exist:

a brake pedal position is greater than a predetermined calibrated threshold; and a duration of the engine speed request is less than a predetermined calibrated time.

17. The continuously variable transmission pump limited stop controls system of claim 11, wherein the engine speed request is issued when the secondary pulley pressure boost system identifies an output pressure from the secondary pulley valve is decreasing identifying an end of the rapid stop event.

18. A continuously variable transmission pump limited stop controls system, comprising:

a continuously variable transmission (CVT) including:
a primary variator pulley and a secondary variator pulley each defining a set of pulley members creating a variable-width gap; and
a flexible member positioned within the variable-gap and movable to define a CVT ratio;

a secondary pulley valve controlling flow of a fluid to the secondary variator pulley;

a secondary pulley pressure boost system identifying if a rapid stop event is occurring and issuing a command to fully open the secondary pulley valve during the rapid stop event; and the secondary pulley pressure boost system including:
a decision module identifying when the rapid stop event is not occurring when a vehicle is decelerating; and
a partial pressure boost module receiving a signal from the decision module when the rapid stop event is not occurring, the partial pressure boost module determining a time to ratio for the vehicle to reach a zero speed.

19. The continuously variable transmission pump limited stop controls system of claim 18, wherein the time to ratio is based on a current vehicle speed and a vehicle deceleration rate.

20. The continuously variable transmission pump limited stop controls system of claim 18, wherein the partial pressure boost module issues a command to at least partially shut the secondary pulley valve to produce a reduced rate of change of the CVT ratio prior to an end of the rapid stop event.

* * * * *